UNITED STATES PATENT OFFICE.

CHARLES R. BURKE, OF TULSA, OKLAHOMA, AND HUGH T. BOYD, OF HOMER, AND PASCAL McD BIDDISON, OF COLUMBUS, OHIO, AND JOHN S. ZINK, OF TULSA, OKLAHOMA.

PROCESS OF PRODUCING MAGNESIUM NITRID.

1,319,843.      Specification of Letters Patent.      Patented Oct. 28, 1919.

No Drawing.      Application filed March 4, 1918. Serial No. 220,368.

*To all whom it may concern:*

Be it known that we, CHARLES R. BURKE, HUGH T. BOYD, PASCAL McD BIDDISON, and JOHN S. ZINK, citizens of the United States, residing respectively, at Tulsa, county of Tulsa, State of Oklahoma, Homer, county of Licking, State of Ohio, Columbus, county of Franklin, State of Ohio, and Tulsa, county of Tulsa, State of Oklahoma, have invented certain new and useful Improvements in Processes of Producing Magnesium Nitrid; and we do hereby declare the following to be a full, clear, and exact description of the invention, such as will enable others skilled in the art to which it appertains to make and use the same.

Our invention consists of a new and improved method for the production or manufacture of ammonia from the nitrogen which occurs in certain natural gases found in some parts of the United States and elsewhere, and it is intended to protect our said invention for all the uses to which it may be applied, with or without modification.

It is a fact, that in certain fields, natural gas occurs which is rich in nitrogen, as well as methane and higher paraffin hydrocarbons, and it is the object of our invention to provide a process whereby these natural gases may be utilized to produce ammonia or ammonium salts, the said process being continuous.

It is known (see *Treadwell-Hall*, vol. 1,) that at about 300° C., magnesium reacts readily with nitrogen, forming magnesium nitrid ($Mg_3N_2$) and that the magnesium nitrid, on subsequent treatment with water, yields ammonia ($NH_3$) as per the following equation:—

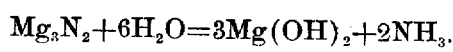

$$Mg_3N_2 + 6H_2O = 3Mg(OH)_2 + 2NH_3.$$

Now we have found, that by first removing those members of the paraffin hydrocarbons, by absorption in a suitable solvent, which might decompose at the temperatures and pressures used, or by any other means, the natural gas, denuded of gasolene vapors, and containing as we have said a high percentage of nitrogen, can, by being passed into a suitable type of apparatus containing magnesium at a temperature of about 300° C., be made to give up its nitrogen in the form of magnesium nitrid and further that the reaction takes place without the removal of the lower members of the paraffin hydrocarbons, which are stable at the temperature and pressures used, such as methane, ethane, etc., these hydrocarbons passing through the reaction zone unaffected.

It is known, and the art practised (see *Bureau of Mines Bulletin* #120), that by passing natural gas containing gasolene vapors through a suitable absorbing menstruum, the gasolene vapors are absorbed therein and can be removed therefrom in the form of commercial gasolene by subsequent distillation and condensation. The absorption can be carried out at atmospheric pressure. We prefer to use pressure higher than atmospheric as we obtain a higher yield with a less volume of the absorption menstruum per unit volume of gas at pressures above atmospheric.

The absorbing medium we use consists of a petroleum distillate having a gravity of 37° Baumé, initial boiling point of 500° F. (about) and final boiling point of 680° F. (about), a flash test of 260° F. and fire test of 320° F. It is not necessary that an absorbing medium of above specifications be used. Any suitable absorbent can be substituted.

We have found, after removal of the gasolene vapors by absorption, that at about 300° C., the magnesium reacts readily with the nitrogen even under atmospheric pressure. We prefer to use the pressures existing in the gas mains regardless of what that pressure may be, as this obviates the necessity of first reducing the pressure to atmospheric and then, after removing the nitrogen, recompressing the gas to put it back into the mains.

If desired, the residue gas from the retort can be burned in incomplete combustion and the flame allowed to impinge on a cold surface for the production of lampblack.

In the operation of this process, the natural gas containing not only nitrogen but also members of the paraffin hydrocarbons, is first passed through absorbers containing some suitable absorption menstruum where the gasolene vapors are removed from the gas leaving the nitrogen and lower members of the paraffin hydrocarbons. From the absorbers this "scrubbed" gas, denuded of gasolene vapors, passes to the retort where at a temperature of about 300° C., the nitrogen in the natural gas reacts with magnesium to form magnesium nitrid. The residual gas from the retort, consisting of paraffin hydrocarbons, is either led back to the gas mains for fuel or burned to produce lampblack. The magnesium nitrid, on treatment with water yields ammonia, which can be recovered in the form of a gas or an ammonium salt.

What we claim and desire to secure by Letters Patent is:—

1. The process of producing magnesium nitrid, which consists in treating a hydrocarbon gas containing nitrogen, with magnesium at a temperature of not less than 300° C.

2. The process of producing magnesium nitrid, which consists in treating a hydrocarbon gas containing nitrogen, with magnesium at about 300° C., and under pressure.

3. The process of producing magnesium nitrid from hydrocarbon gas containing nitrogen, which consists in first removing any gasolene vapors from the gas, reacting the gas so impoverished containing nitrogen, with magnesium at not less than about 300° C., and under pressure, whereby the nitrogen and magnesium are converted into magnesium nitrid.

4. The process of producing magnesium nitrid from hydrocarbon gas containing nitrogen, which consists in first removing any gasolene vapors from the gas, reacting the gas so impoverished containing nitrogen, with magnesium at not less than about 300° C., whereby the nitrogen and magnesium are converted into magnesium nitrid.

5. The process of producing magnesium nitrid from hydrocarbon gas containing nitrogen, which consists in first removing any gasolene vapors by passing the gas through a hydrocarbon oil, under pressure, reacting the scrubbed gas containing nitrogen, with magnesium at not less than 300° C., and under pressure, whereby the nitrogen and magnesium are converted into magnesium nitrid.

6. The process of producing magnesium nitrid from hydrocarbon gas containing nitrogen, which consists in first removing any gasolene vapors by passing the gas through a hydrocarbon oil, reacting the scrubbed gas containing nitrogen with magnesium at not less than 300° C., and under pressure, whereby the nitrogen and magnesium are converted into magnesium nitrid.

7. The process of producing magnesium nitrid from hydrocarbon gas containing nitrogen, which consists in first removing any gasolene vapors by passing the gas through a hydrocarbon oil, reacting the scrubbed gas containing nitrogen with magnesium at not less than 300° C., whereby the nitrogen and magnesium are converted into magnesium nitrid.

8. The process of producing magnesium nitrid from natural gas containing nitrogen and paraffin hydrocarbons, which consists in first removing any gasolene vapors by absorption in a high boiling petroleum distillate under pressure, reacting the residual gas with magnesium at not less than 300° C., and under pressure, whereby the nitrogen and magnesium are converted into magnesium nitrid.

9. The process of continuously treating natural gas containing nitrogen, and paraffin hydrocarbons for the production of magnesium nitrid, which consists in first removing the gasolene vapors by absorption in a hydrocarbon oil, then reacting the residual gas containing nitrogen and lower boiling paraffin hydrocarbons with magnesium, at not less than 300° C., under pressure in a separate reaction chamber whereby the nitrogen and magnesium are converted into magnesium nitrid.

10. The process for the production of magnesium nitrid from natural gas containing nitrogen, methane or other liquefiable paraffin hydrocarbons, which consists in passing the gas through a hydrocarbon oil, and removing therefrom those hydrocarbons which may, when liquefied, be used as motor spirits or gasolene, and treating the residual gases with magnesium whereby the nitrogen and magnesium are converted into magnesium nitrid.

In testimony whereof we affix our signatures.

CHARLES R. BURKE.
HUGH T. BOYD.
PASCAL McD BIDDISON.
JOHN S. ZINK.

Copies of this patent may be obtained for five cents each, by addressing the "Commissioner of Patents, Washington, D. C."